J. W. KELLY.
STALK CUTTER.
APPLICATION FILED JULY 21, 1919.

1,410,320.

Patented Mar. 21, 1922.
3 SHEETS—SHEET 1.

Inventor
J. W. Kelly
By Geo. P. Kimmel
Attorney

J. W. KELLY.
STALK CUTTER.
APPLICATION FILED JULY 21, 1919.

1,410,320.

Patented Mar. 21, 1922.
3 SHEETS—SHEET 2.

Inventor
J. W. Kelly

By Geo. S. Kimmel
Attorney

UNITED STATES PATENT OFFICE.

JOHN W. KELLY, OF SILVER CITY, MISSISSIPPI.

STALK CUTTER.

1,410,320. Specification of Letters Patent. Patented Mar. 21, 1922.

Application filed July 21, 1919. Serial No. 312,223.

*To all whom it may concern:*

Be it known that I, JOHN W. KELLY, a citizen of the United States, residing at Silver City, in the county of Yazoo and State of Mississippi, have invented certain new and useful Improvements in a Stalk Cutter, of which the following is a specification.

This invention has for its object to provide a stalk cutter for use in corn and cotton fields embodying a main cutting element adequately supported in a wheel mounted frame in advance of an improved cutting mechanism by which the stalks subsequent to being cut by the main front cutters are severed into relatively small pieces which may be readily turned under the soil by a plow or other ground working element.

Another object is the provision of a stalk cutter of this character in which endless conveyors are employed for conveying the cut stalks from the front cutting elements to the cutting mechanism, thereby ensuring positive engagement of said stalks with the cutting mechanism.

With these and other objects in view as will appear as the description proceeds the invention comprises the novel features of construction combination of elements and arrangement of parts which will be more fully described in the following specification and set forth with particularity in the claims appended hereto.

Figure 1:
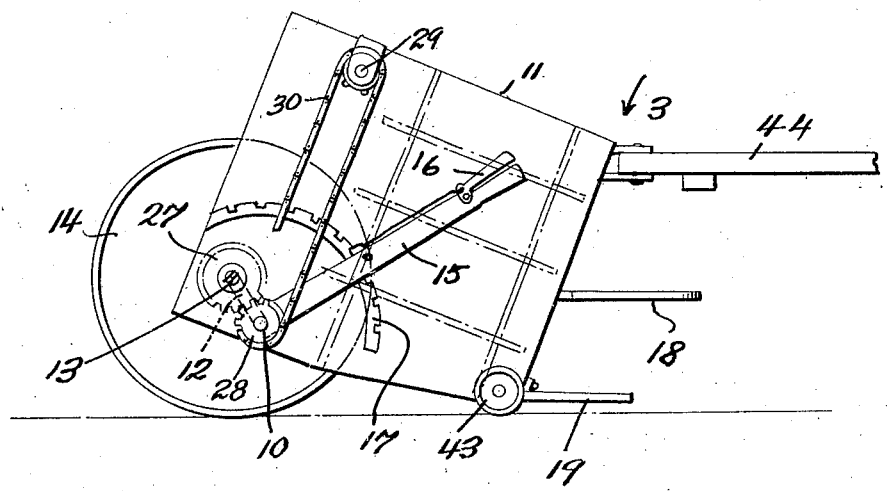
Figure 1 represents a side elevation of the improved stalk cutter, one wheel being removed and the adjacent portion of the axle being shown in section.
Figure 2:
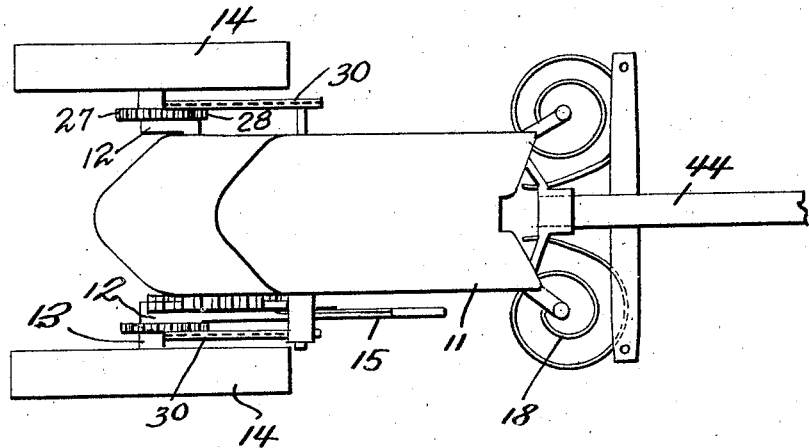
Figure 2 represents a top plan view thereof.

Referring to the drawing in detail, wherein similar reference numerals designate corresponding parts throughout the several views the numeral 10 indicates a supporting shaft which extends transversely in a horizontal plane through a housing or hood 11 for the conveying and cutting mechanism to be hereinafter described. The terminals of the shaft are provided with parallel laterally projecting arms 12 carrying outwardly projecting axles 13 to which the supporting wheels 14 of the stalk cutter are secured.

An adjusting arm 15 is rigidly connected adjacent one terminal of the shaft 10, extends upwardly along one side of the housing 11 and is provided with a preferred type of locking device 16 engageable with a rack segment 17 secured to one side wall of the housing 11 whereby the shaft may be locked in adjusted position to maintain the rear portion of housing at a desired elevation above the ground over which it travels.

The front end of the hood 11 is open so that the upstanding stalks may enter the same during travel of the cutter and outwardly divergent and coiled guide members 18 are secured to the front open end of the hood and are designed to engage the stalks as the cutter approaches them in order that they will be properly guided into the entrance opening of the hood.

Superposed cutting blades 19 having rearwardly converging cutting edges 20 are arranged at the lower end of the entrance to the hood by which the stalks are cut at a point adjacent the roots thereof.

A transverse bearing member 21 is secured in the lower open portion of the hood or housing 11 and rotatably supports a pair of spaced forwardly inclined shafts $21^a$ and 22. The upper terminals of the shafts are journaled in the upper portion 23 of the hood and preferred types of ball bearings 24 are preferably interposed between the lower terminals of the shafts and the bearing member 21 so as to reduce frictional resistance to the rotary movement thereof incident to the operation of the cutting mechanism.

The shaft 22 is rotatably mounted against lateral movement in the bearing members 21 and 23 whereas the terminals of the shaft $21^a$ are received in slots $24^a$ formed in the bearing members 21 and 23 so as to permit limited lateral movement of the shaft $21^a$ toward and away from the shaft 22.

A plurality of rotary circular cutting blades 25 and 26 are arranged in superposed relation upon the shafts 21ª and 22, respectively, and during rotary movement of the respective shafts in opposite directions the cutting blades are designed to cut the stalks into small pieces which fall through the open bottom of the hood or housing 11 upon the ground.

The supporting wheels 14 of the stalk cutter are connected with gear wheels 27 which mesh with similar gear wheels 28 mounted upon the terminal portions of the shaft 10 outwardly of the arms 12 and having connection with the upper shafts 29 journaled in the upper portion of the hood 11 by chains 30 or other preferred types of power transmitting devices. The inner terminals of the shafts 29 are journaled in supplementary bearing members 31 mounted internally of the hood 11 and the shafts 21ª and 22 are operatively connected with the shafts 29 by bevel gear wheels 22 by which the rotary motion of the shafts 29 is transmitted to the cutting shafts of the cutting mechanism. The drive shaft 29 for the laterally movable shaft 21ª is mounted for longitudinal movement through the hood 11 to compensate for the movement of the shaft 21ª laterally while the bevel gear wheel of the shaft 29 is retained in mesh with the gear wheel of the relatively movable shaft by the tension of a coiled spring 33 arranged upon the shaft 29 and confined between the bearing member 31 and the hub of gear 32.

A third vertical shaft 34 is mounted in the rear portion of the hood 11 behind the shafts 21ª and 22 and carries a plurality of cleaner disks 35 which enter between the cutting blades 26 and are designed to prevent pieces of the cut stalks from obstructing the free passage between the blades 25 and 26. Rotary movement is transmitted to the shaft 34 from the shaft 22 through gear wheels 36.

Pairs of vertically disposed shafts 37 are arranged in the opposite sides of the hood 11 and one shaft of each pair is arranged forwardly of the other, the rear shaft of the pair being connected by a chain or other power transmitting device 38 with one of the shafts 21ª or 22 whereby rotary movement is transmitted to the shafts 37 during operation of the stalk cutter. The lower terminal of the cleaner shaft 34 is journaled in a rear extension 39 of the bearing member 21.

Figure 3:
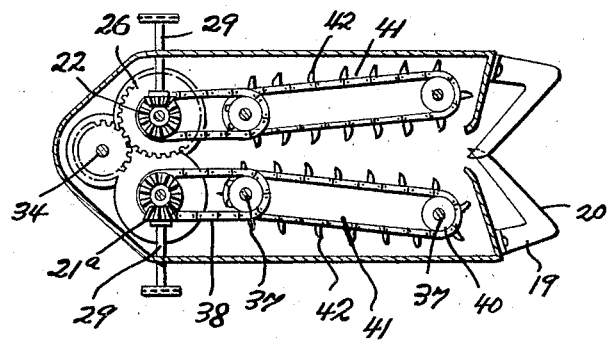
Figure 3 represents a horizontal sectional view on the line 3—3 of Figure 1.
Figure 4:
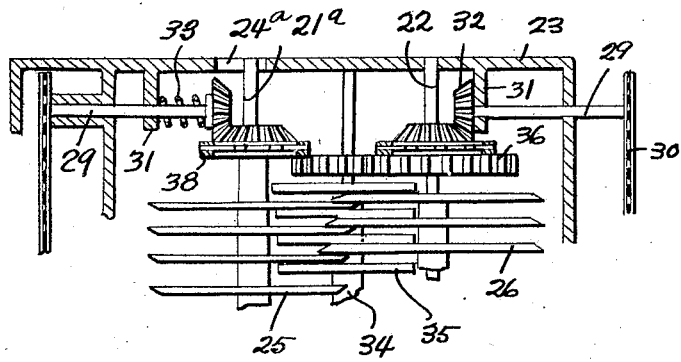
Figure 4 represents a fragmentary vertical sectional view taken at right angles to Figure 3 in the plane of the drive shafts for the cutting mechanism.
Figure 7:
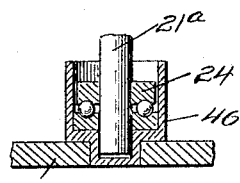
Figure 7 is a sectional view of one of the grease containers for the cutter and cleaner shafts.
Figure 5:
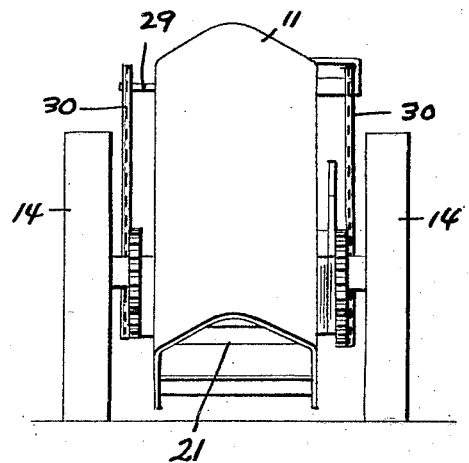
Figure 5 represents a rear elevation of the stalk cutter.
Figure 6:
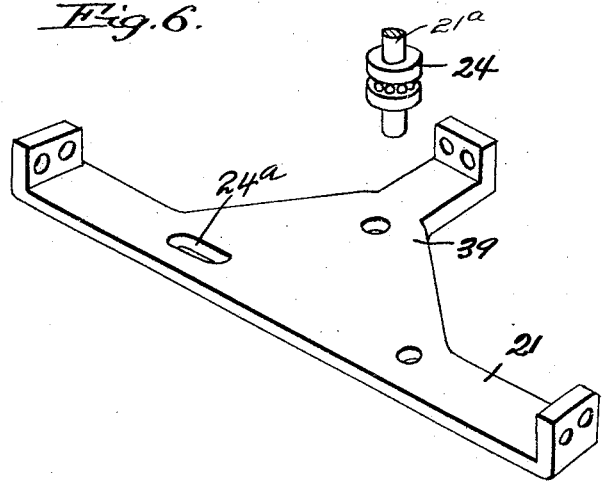
Figure 6 represents a perspective view of the supporting members for the rotary cutters of the stalk cutting mechanism, one of the ball bearing supports for the cutting elements being illustrated as detached from the bearing member.

Sprocket wheels 40 are arranged in superposed relation upon the several shafts 37 and support endless conveyor chains 41 having outwardly directed teeth 42 thereon arranged to push or convey stalks entering between the conveyor chains rearwardly toward the cutting mechanism, and, as clearly shown in Figure 3 the shafts of the respective pairs are so arranged that the adjacent portions of the chains 42 are disposed in rearwardly converging relation thereby permitting the stalks to freely enter between the forward portions of the chains during travel of the machine. Preferably three sets of superposed chains 41 are provided in order to engage the stalks at three points throughout their length and thereby efficiently carry the stalks rearwardly to the cutting mechanism.

Supporting wheels 43 are arranged at the lower forward portion of the hood 11 and movably support the same upon the ground and a preferred type of draft appliance 44 is secured to the forward portion of the hood whereby the stalk cutter may be conveniently conveyed.

In use, the stalk cutter is drawn over the ground in such manner that the entrance opening of the hood 11 is disposed in direct alignment with the row of stalks to be cut and by proper adjustment of the operating arm 15 the hood and cutting mechanism is permitted to descend to operative position. As the stalk cutter is conveyed the stalks enter between the coiled gathering arms or guides 18 and are cut, at points adjacent the roots by the cutting knives 19, the tops of the stalks being subsequently engaged and carried rearwardly between the conveyors 41 until they are brought into positive engagement with the rotary cutting blades 25 and 26 by which the stalks are severed into relatively small pieces, finally falling through the open bottom of the hood upon the ground. The relatively small pieces of the stalks are prevented from lodging between and obstructing the blades 25 and 26 by the cleaner disks 36, the latter being constantly driven during operation of the stalk cutter from the shaft 22 through the gear wheels 36.

Cups 46 are interposed between the bearing member 21 and the anti-friction bearings 24 and are designed to contain grease whereby the shafts are maintained in a lubricated condition.

What I claim is:

1. A stalk cutting apparatus of the class described comprising a housing, a supporting shaft for said housing, the ends of said shaft having laterally projecting arms carrying outwardly projecting axles and supporting wheels thereon, an adjusting arm connected to the supporting shaft, a segment rack carried by the housing cooperating with the adjusting arm for maintaining the rear portion of the housing in various elevated positions, guide members secured to the open front of the housing to engage the stalks in advance of their entry thereto, cutting elements arranged at the lower entrance of the housing for cutting the stalks at a point adjacent the roots thereof, a transverse bearing member and a plurality of inclined shafts carried thereby secured to the lower portion of the housing, means permitting lateral movement of one of said shafts in the bearing member, cutting blades rotatably mounted with said shafts, a plurality of superposed endless conveyor belts driven from said shafts, and gearing operatively connecting the inclined shafts with the supporting wheels for operating the conveying and cutting mechanisms during the forward travel of the machine.

2. A stalk cutting apparatus of the class described comprising a housing, a supporting shaft extending through the housing, the ends of said shaft having laterally projecting arms carrying outwardly projecting axles and supporting wheels mounted on said axles, an adjusting arm rigidly connected adjacent one end of the supporting shaft, a segment rack secured to the side wall of the housing to maintain the rear portion thereof at a desired elevation above the ground, coiled guide members secured to the open front of the housing to engage the stalk in advance of their entry thereto, cutting blades having rearwardly converging cutting edges arranged at the lower entrance to the housing for cutting the stalks at a point adjacent the roots thereof, a transverse bearing member and a plurality of inclined shafts carried thereby secured to the lower portion of the housing, one of said shafts being mounted to permit lateral movement thereof in the bearing member, superposed cutting blades rotatably mounted with said shafts, a plurality of superposed endless conveyor belts driven from said shafts, and gearing operatively connecting the supporting wheels with the inclined shafts for operating the conveying and cutting mechanisms upon the forward rotation of the machine.

In testimony whereof, I affix my signature hereto.

JOHN W. KELLY.